2,782,129

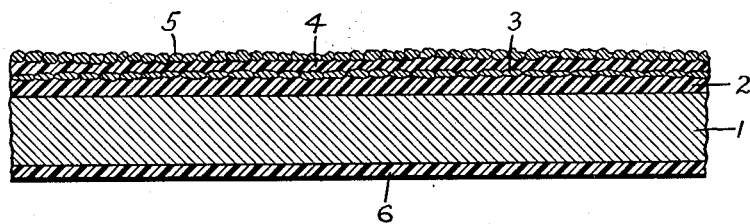

FIRE RETARDANT COATED ROOFING SHEET AND PROCESS FOR PREPARING

Joseph W. Donegan, Leonia, N. J., assignor to Allied Chemical & Dye Corporation, New York, N. Y., a corporation of New York Application December 20, 1955, Serial No. 563,402

8 Claims. (Cl. 117—30)

This invention relates to fire retardant surfacing materials, and more especially to fire retardant asphalt roofing and shingle compositions and to a method for preparing them.

Conventional roofing and shingle compositions usually consist of an asphalt-saturated roofing felt base supporting one or more asphalt coatings, which may or may not contain mineral fillers such as ground clay, slate dust, etc., and having mineral granules embedded in the upper portions of the asphalt coatings. Such roofings are combustible, and when exposed to severe fire are readily ignited, the conventional mineral fillers and granules affording little fire protection. The fire hazard in the case of such roofings is increased by the fact that when such roofings are heated, as by exposure to fire, the coatings soon start to flow, and thus tend to aid the fire by burning and propagating the flame down the roof slope to the building structure.

In spite of their lack of fire retardance, conventional asphalt-felt roofings enjoy widespread use because of their excellent weather resistance, combined with their inexpensiveness as compared to the more fire resistant roofings such as slate and tile.

The low cost of the asphalt-felt roofing is made possible by the mass production method of manufacture which permits high speed continuous saturation and coating of the felt base in web form in conventional saturating and coating equipment. While such equipment represents a high initial investment cost, it can turn out roofings at high speeds, operating usually at speeds between about 150 and 250 linear feet per minute. Such machines can operate efficiently only if run at the high speeds for which they are designed and, thus, operation with any degree of success depends on application of coatings having physical characteristics such as viscosity, flow, mobility, etc., within the narrow limits required for such application.

Many efforts have been made in the past to improve the fire retardance of the otherwise advantageous asphalt roofings of the class referred to. Early efforts in this direction involved the use of fire retardant fillers such as asbestos, mineral wool, vermiculite, etc., in the asphalt coatings. These efforts sought to accomplish two objects; first, to retard the flow of the coating so as to prevent its running off the felt base when exposed to fire; second, to provide a fire barrier for the underlying roof. The quantities of fire retardant fillers which must be used to attain fire retardance, however, produced coatings so lacking in mobility that they could not be applied on conventional coating equipment and thus sacrificed the primary advantage of inexpensiveness of manufacture for which this type of roofing is valued.

It is a primary object of the present invention to provide a highly fire retardant, asphalt-coated, asphalt-saturated, felt base roofing using conventional coating materials and conventional coating procedures on standard coating machine equipment.

A further object of the invention is to provide a fire retardant composite coating applicable to asphalt-saturated roofing felt by conventional coating equipment.

These and other objects are accomplished according to my invention, wherein a conventional asphalt-saturated felt base is coated on one side with two layers of coating composition comprising asphalt and between about 5% and about 20% of asbestos fibre of a grade equivalent to a group 7 grade separated by an intermediate layer of unexpanded vermiculite granules.

The crux of the invention depends on utilization of unexpanded vermiculite as an interlayer between two layers of an asbestos-containing asphalt coating composition of critical characteristics. Thus, the coating should contain a sufficient quantity of a proper type of asbestos to impart an appreciable degree of fire retardance, and to decrease somewhat the ultimate flow of the coating when heated, but insufficient to so decrease mobility of the coating at application temperature as to preclude its application on conventional coating machines.

The quantity and character of the asbestos fibre used as filler for the conventional coating asphalt are therefore critical. Suitable asbestos fibres are those of a type classified as any one of the group 7 grades according to screen analyses as set forth in the Canadian Department of Mines Bulletin 707 (1931) and U. S. Bureau of Mines Bulletin 403 on Asbestos (1937).

Thus, asbestos designated as grades 7–F, 7–R, 7–K, etc. or their equivalents may be used.

A typical 7–F asbestos fibre would screen as follows:

$$0\text{—}0\text{—}4\text{—}12$$

a typical 7–K asbestos fibre would screen as follows:

$$0\text{—}0\text{—}2\text{—}14$$

while a typical 7–R asbestos would screen as follows:

$$0\text{—}0\text{—}0\text{—}16$$

In the above analyses, a 16 ounce sample of asbestos is sifted successively through a nest of screens having openings ½ inch, 4 mesh and 10 mesh. The first number represents the amount by weight, in ounces, of fibre retained on the ½ inch screen; the second number represents the amount retained on the 4 mesh screen; the third number represents the amount retained on the 10 mesh screen; and the last number represents the amount by weight passing through the 10 mesh screen. The fibres of the group 7 grades, therefore, are all relatively short fibres, the 7–F grade containing substantially more longer fibered material than the 7–R grade. Since the longer fibre asbestos retards the flow of the asphalt coating to a greater extent than does the shorter fibre, larger quantities of short fibre asbestos than long fibre asbestos will be used to attain a comparable or higher degree of fire retardance for the same loss of application mobility than is required of the longer fibre. Use of fibres longer than those of the group 7 grades, in amounts sufficient to contribute appreciable fire retardance, makes for such greatly lowered mobilities as to preclude application by conventional coating equipment, and produces an undesirably rough, coarse coating. Fibres shorter than the group 7 grade have inadequate flow stabilizing qualities and thus fail to produce asbestos-asphalt coatings which have adequate flow resistance.

I have found that asbestos fibres of the grades indicated, used in amounts between about 5% and about 20% based on the weight of the asphalt, in general produce an adequate fire retarding effect (when used in conjunction with the vermiculite interlayer), and also produce coatings with diminished flow characteristics, but which still have sufficient mobilities to operate satisfactorily on conventional machines, at conventional high speeds.

Using a 7-F asbestos fibre, quantities between about 5% and about 10% by weight based on the weight of the asphalt are preferred, whereas with the shorter grades in the 7 group, for example with 7-R, quantities between about 10% and about 20% are satisfactory. All the fibres in the coating may be of a single grade, or mixtures of any two or more grades of the 7 group asbestos fibres may be used to obtain the desired balance between fire retardance and coating mobility.

In any event, the softening point (a measure of mobility) of the asbestos-containing asphalt coating composition of my invention should not exceed about 285° F. by the Standard ASTM test method D-36-26 (Ring and Ball method), preferably should be between about 250° F. and about 275° F.

For the purposes of my invention I may use conventional roofing asphalt such as an air blown asphalt having a softening point (R & B) between about 215° F. and about 240° F.

The asbestos-filled asphalt coatings above described, when applied to conventional roofing felt, are inadequate per se, when applied as a single coat or even as a double coat with an intermediate layer of conventional mineral granules, to produce a roofing with good fire retarding characteristics. If, however, instead of conventional mineral granules a layer of unexpanded vermiculite is interposed between two coatings of asbestos-filled asphalt according to my invention, a roofing material results which has superior fire retarding characteristics. Products of the invention readily pass the Underwriters' Laboratories qualification tests for class A roofing.

The vermiculite used is of the unexpanded type in granular form and, in size, preferably between about 8 mesh and about 30 mesh, suitably 10-20 mesh, and may be applied in amounts between about 5 and about 15 pounds per 100 square feet of roofing sheet. As is well known, vermiculite expands on heating to about 550-600° F., and exfoliates to produce a rigid, non-inflammable, porous mass.

Thus, in the event of fire, the presence of asbestos retards the flowing tendency of the asphalt so that little or no flame spread takes place due to flow of the coating, while the vermiculite interlayer decomposes and expands at a temperature somewhat below the ignition temperature of the coating to form an absorbent, fire resistant support or rigid sponge which absorbs the asphalt, preventing flow and providing an effective fire barrier to the underlying roof.

The vermiculite may be used as the single component of the intermediate layer, or it may be mixed with conventional mineral granules, so long as the critical amounts, indicated above, required for imparting adequate fire retardant characteristics to the composite roofing, are employed.

In preparing the fire retardant roofing sheet according to my invention, the asphalt coatings are prepared by heating the asphalt to a fluent state and mixing in the asbestos fibre, as in a turbo-mixer. Other conventional fillers such as slate dust, ground clay, etc., may be included if desired, but are not essential. A conventional rag felt, of thickness, for example, from .055 to .070 inch and weighing from 49 to 55 pounds dry per 480 square feet, is impregnated with an asphalt saturant in conventional manner to saturate it, for example, to 175-185 percent of its dry weight.

The face of the resultant saturated felt is then coated in a conventional coating machine with the asbestos-containing asphalt coating. Both sides of the saturated felt may be thus coated, or only the face thus coated and the back coated with a conventional asphalt coating containing no asbestos fibres. In either case, the coating on the back of the felt is dusted with talc or mica, as is customary in the roofing art.

The coating on the face of the felt may be applied in the customary amount of about 20 pounds per 100 square feet or may vary in weight somewhat from this standard figure, for example between about 15 pounds and about 30 pounds per 100 square feet.

After the first coating has been applied and doctored to the desired thickness, the hot sheet is run beneath a shower or curtain of unexpanded vermiculite granules, preferably of between about 10 and about 20 mesh particle size, in the desired amount, preferably between about 8 pounds and about 12 pounds per 100 square feet. The coated web then passes through press rolls to bind the vermiculite layer to the asphalt-asbestos coating. The sheet is then reversed to permit excess, unbound vermiculite to fall off and then passes over print rolls where the second asphalt-asbestos coating, similar to the first, is applied over the vermiculite layer. The sheet may next be coated, while still hot, with a coating of decorative granules in conventional manner. The resulting finished web is then cut into strips, shingles or other desired shapes.

The following examples further illustrate my invention.

EXAMPLES 1 AND 2

Conventional, asphalt-saturated, rag roofing felts were coated on their faces with double coatings of asbestos-filled asphalt coating and an intermediate vermiculite layer on a standard coating machine in two tests, one using a coating containing 7.0% asbestos, the other using a coating containing 9.0% asbestos, as follows:

Unfilled shingle coating consisting of air blown asphalt having a softening point of 219° F. by ASTM test method D-36-26 (R & B), was charged to a turbo-mixer in the molten state at a temperature of about 495° F., and 7-F grade asbestos was added. After mixing for 30 minutes to disperse the asbestos in the asphalt, the resulting asbestos-filled coating was flowed to the conventional coating machine running at a speed of 200 feet per minute. A coating containing about 7% asbestos and also a coating containing 9.0% asbestos flowed satisfactorily to the machine and both coatings were applied satisfactorily to the felt from both primary and secondary pans at the conventional machine speed of 200 feet per minute.

After asbestos-filled coating had been applied to the face of the felt, a shower of 10-20 mesh vermiculite was applied, pressed, and the second coating of asbestos-filled asphalt was applied over the vermiculite. Conventional mineral granules were applied over the second asbestos-asphalt coating. The back of the felt received a single coating of the asbestos-filled asphalt. Operating data are shown in the table below.

*Table*

| Example No. | 1 | 2 |
|---|---|---|
| Asphalt base, lbs | 3,773 | 3,337 |
| 7-F Asbestos, lbs | 284 | 330 |
| 7-F Asbestos, percent | 7.0 | 9.0 |
| Softening point of coating [1] | 255 | 275 |
| Temperature of coating at— | | |
| Primary pan, ° F | 430 | 440 |
| Secondary pan, ° F | 420 | 450 |
| Product weights, lbs./100 sq. ft | 105 | 101 |

[1] ASTM D-36-26.

The resulting roofing materials were cut into 12" x 16" shingles and these shingles were subjected to the three standard tests prescribed by the Underwriters' Laboratories. For each of two tests, a 3⅓ x 4⅓ foot roof deck was constructed of dressed ¾" x 8" No. 1 white pine laid across the short dimension of the deck, spaced ¼ inch apart and nailed to 2" x 4" battens flush with the outer edges. The two sets of shingles prepared in the above test were laid on the decks in standard three-ply coverage, leaving double coverage only at the tab cut-out portions. The decks were placed so as to provide a slope of 5"/ft. in a wind tunnel and tested with a wind velocity of 12 M. P. H. at the mid point of slope and 3¹¹⁄₁₆" above the deck surface.

One set of decks was tested by bathing the width of the deck surface with a gas flame about 4 feet long for 2 minute periods 2 minutes apart for 15 cycles. No asphalt drippage, flow of coating or detachment of burning brands occurred and no burning of the roof deck or smoking at cracks thereof was observed.

A second set was tested by placing a flaming brand on the deck. The brand was made up of 36 12-inch strips of 1 inch kiln-dried Douglas fir dressed on all sides, in three layers of 12 strips each spaced about ¼ inch apart and nailed to the adjacent layer, with strips of each layer at right angles to the next. The brand was ignited by a gas flame and after it was burning freely, placed on the deck. The deck was subjected to a wind of 12 M. P. H. while on an incline of 5 in./ft. as in the previous test. Inspection of the deck after the brand had been consumed and all flaming of the roof had ceased showed that no burning of the deck had been effected nor had serious asphalt drippage or flow occurred.

For the third test a similar deck was constructed except that the dimensions were 3⅓ x 13 ft. and shingles were applied as in the previous tests over the entire surface. The deck was placed so as to provide a slope of 5"/ft. in a wind tunnel and tested with a wind velocity of 12 M. P. H. at the mid point of slope and 3¹¹⁄₁₆" above the deck surface. The gas flame as described in the first test was applied continuously until the flame spread upon the roof deck had reached a maximum and then receded.

In all the above tests, the shingles were well within the limits prescribed for class A qualifications.

My invention makes possible the production of asphalt roofings of superior fire-resistance by the use of conventional machines and by conventional operating procedures. Thus, the conventional asphalt-saturated felt base is used. Coating asphalts of conventional type are used for my coatings. With these standard materials, the use of asbestos-filled coatings containing the critical quantity af asbestos of the indicated character results in coatings which are fluid and flowable at elevated temperatures so that they can be applied by conventional coating equipment, as distinguished from gummy, pasty masses which may impart complete fire resistance per se, but which cannot be so applied, and must be applied by relatively cumbersome and expensive methods by special equipment requiring heavy capital investment. My use of the interlayer of vermiculite compensates for the slight remaining inadequacies in fire retardance and flow tendencies of the coating by immobilizing the hot coating in an exfoliated, sponge-like core where it carbonizes to form a noninflammable, vesicular coke.

Instead of using a filler consisting solely of asbestos fibre in the asphalt coating, additional filler of conventional type such as slate dust, clay, etc. may be included in quantities to provide a total fibre plus filler content of up to about 30%, thus reducing asphalt content to as low as about 70%. The two asbestos-asphalt layers may be of the same composition or may differ from each other within the limits set out above. Similarly, the vermiculite layer may be supplemented by admixture with granules of conventional type if desired, e. g. slate, slag, quartz, rhyolite, granite, etc.

While the above describes the preferred embodiments of my invention, it will be understood that departures may be made therefrom within the scope of the specification and claims.

I claim:

1. A fire retardant asphalt roof covering comprising an asphalt-saturated felt base having applied thereto a composite coating comprising a layer of unexpanded vermiculite positioned between two layers of a composition comprising an asphalt and between about 5% and about 20% of asbestos fibres of a type classifiable as a group 7 grade asbestos, said composition having a softening point by ASTM test method D–36–26 between about 250° F. and about 285° F.

2. The roof covering according to claim 1, wherein the top layer of asbestos-asphalt coating has a layer of mineral granules embedded therein.

3. The roof covering according to claim 1, wherein each asbestos-asphalt layer is present in a thickness corresponding to between about 15 pounds and about 30 pounds per 100 square feet, and the vermiculite layer amounts to between about 5 pounds and about 15 pounds per 100 square feet.

4. A fire retardant asphalt roof covering comprising an asphalt-saturated felt base having applied thereto a composite coating comprising a layer of unexpanded granular vermiculite of between about 8 and about 30 mesh positioned between two layers of a composition comprising an air-blown asphalt having dispersed therein between about 5% and about 10% of asbestos of grade 7–F equivalent, said composition having a softening point by ASTM test method D–36–26 between about 250° F. and about 275° F.

5. A composite weather resistant and fire retardant roofing felt coating adapted for application to asphalt saturated felt in conventional coating machine equipment, comprising an intermediate layer of unexpanded vermiculite encased between layers of a composition comprising asphalt and between about 5% and about 20% of asbestos fibres of a group 7 equivalent, said asphalt coating composition having a softening point by ASTM test method D–36–26 between about 250° F. and about 285° F.

6. A process for producing a fire retardant asphalt roof covering which comprises applying to an asphalt saturated felt base a composite coating comprising a layer of unexpanded vermiculite positioned between two layers of a composition comprising an asphalt and between about 5% and about 20% of asbestos fibres of a type classifiable as group 7 grade asbestos, said composition having a softening point by ASTM test method D–36–26 between about 250° F.–285° F.

7. A process for producing a fire retardant asphalt roof covering which comprises applying to an asphalt saturated roofing felt in sequence, a coating comprising asphalt and between about 5% and about 20% of asbestos fibre of grade 7–F equivalent, a coating of unexpanded vermiculite granules having a particle size between about 8 mesh and about 30 mesh and a coating like the first coating.

8. A process for producing a fire retardant asphalt roof covering which comprises applying to an asphalt-saturated roofing felt a first coating comprising asphalt and between about 5% and about 10% of asbestos fibre of grade 7–F equivalent, a second coating of unexpanded vermiculite having a particle size between about 10 mesh and about 20 mesh, a third coating like the first coating and a final coating of mineral granules.

No references cited.